United States Patent [19]
Bercelli et al.

[11] Patent Number: 6,079,541
[45] Date of Patent: Jun. 27, 2000

[54] CONTAINER GRIPPER, IN PARTICULAR FOR BOTTLES

[75] Inventors: Gianluca Bercelli, Varano de' Melegari; Enrico Folli, Collecchio, both of Italy

[73] Assignee: S.B.R S.r.l., Sala Baganza, Italy

[21] Appl. No.: 09/002,407

[22] Filed: Jan. 8, 1998

[30] Foreign Application Priority Data

Jan. 16, 1997 [IT] Italy .................................. MI97A0076

[51] Int. Cl.[7] .................................................. B65G 17/32
[52] U.S. Cl. .................................. 198/377.03; 198/470.1; 198/803.7
[58] Field of Search .................. 198/377.03, 470.1, 198/803.7

[56] References Cited

U.S. PATENT DOCUMENTS

| | | | |
|---|---|---|---|
| 3,570,647 | 3/1971 | Meikle | 198/470.1 X |
| 3,881,607 | 5/1975 | Lewis | 198/210 X |
| 3,944,058 | 3/1976 | Strauss | 198/470.1 X |
| 4,183,428 | 1/1980 | McGill et al. | 198/803.7 X |
| 4,468,277 | 8/1984 | Kontz | 198/803 X |
| 5,711,411 | 1/1998 | Zurweller | 198/470.1 |
| 5,743,377 | 4/1998 | Kronseder | 198/470.1 X |

FOREIGN PATENT DOCUMENTS

| | | |
|---|---|---|
| 0 345 470 | 12/1989 | European Pat. Off. . |
| 2 489 802 | 3/1982 | France . |
| 26 15 007 | 10/1977 | Germany . |
| WO 91/15309 | 10/1991 | WIPO . |

Primary Examiner—Christopher P. Ellis
Assistant Examiner—Gene O. Crawford
Attorney, Agent, or Firm—Oblon, Spivak, McClelland, Maier & Neustadt, P.C.

[57] ABSTRACT

A container gripper, in particular for bottles, which is positionable on a movable part of a manipulating machine, and comprises a support structure internally carrying a pair of arms driven to rotate between a closed rest position in which they face each other to retain the container, and an open position in which they are withdrawn from each other to release the container; the support structure includes a U-shaped bracket (15) supporting a block (18) rotatable about the bracket, the arms being pivoted to the block and carrying, pivoted to the opposite end to their gripping end, a pair of connecting rods for rotating the arms, one of the connecting rods extending into a right-angled lever which can engage a cam fixed relative to the movable part of the manipulating machine, the connecting rods (31) being pivoted at their other ends to a pin slidable within a seat in the block by way of an interposed elastic element which when at rest maintains the arms in a closed position.

10 Claims, 3 Drawing Sheets

CONTAINER GRIPPER, IN PARTICULAR FOR BOTTLES

BACKGROUND OF THE INVENTION

1. Field of the Invention

This invention relates to a container gripper, in particular for bottles or the like.

2. Discussion of the Background

In the packaging industry, and in particular in the filling of bottles or similar containers, a series of operations is required before filling them with the product.

Typically the container to be used must be washed, rinsed and finally sterilized. For these operations the containers, such as bottles, are manipulated by a suitable conveyor which grips them, inverts them, and positions them in proximity with the stations dedicated to the various aforestated operations.

This conveyor, for example in the form of a carousel, comprises for this purpose a plurality of gripping elements which act on the container. In particular in the case of bottles, the gripping elements become positioned about the bottle neck or about a part of small cross-section, and must be movable. In this respect, these gripping elements must be able to assume a position in which the container faces upwards (for gripping, washing and depositing) and a position in which the container faces downwards (for rinsing and sterilizing). The gripping elements used are similar to grippers comprising a pair of arms or jaws openable and closable by suitable means.

The arms of these known grippers are operated by suitable levers which act on cams and are made to assume a preselected position by interposed elastic elements.

The elastic elements are usually intended to securely close the gripper arms about the container neck. A considerable force has consequently to be applied in opening them and securely maintaining them in that position, often resulting in breakage or poor operation.

Some of these grippers are provided with pads located in the region of direct contact with the container in order to minimize or nullify the danger of its breaking. These pads have however the drawback of having to be changed to adapt to the size of the container or of its gripping region.

SUMMARY OF THE INVENTION

An object of the invention is to provide a container gripper, in particular for bottles, which solves said problems and is of reliable and simple operation.

A further object is to provide a container gripper, in particular for bottles, which can adapt to various container or bottle sizes, without it being necessary to change the pads provided in it. These objects are attained according to the invention by a container gripper, in particular for bottles, which is positionable on a movable part of a manipulating machine for bottles or similar containers, and comprises a support structure internally carrying a pair of arms driven to rotate between a closed rest position in which they face each other to retain said container, and an open position in which they are withdrawn from each other to release said container, characterised in that said support structure comprises a U-shaped bracket supporting a block rotatable about said bracket, said arms being pivoted to said block and carrying, pivoted to the opposite end to their gripping end, a pair of connecting rods for rotating the arms, one of said connecting rods extending into a right-angled lever which can engage a cam fixed relative to said movable part of the manipulating machine and positioned in a localized region, said connecting rods being pivoted at their other ends to a pin slidable within a seat in said block by way of an interposed elastic element which when at rest maintains said arms in their closed position.

BRIEF DESCRIPTION OF THE DRAWINGS

The characteristics and advantages of a container gripper, in particular for bottles, according to this invention will be more apparent from the ensuing description given by way of non-limiting example, with reference to the accompanying schematic drawings on which.

DESCRIPTION OF THE PREFERRED EMBODIMENTS

Figure 1:
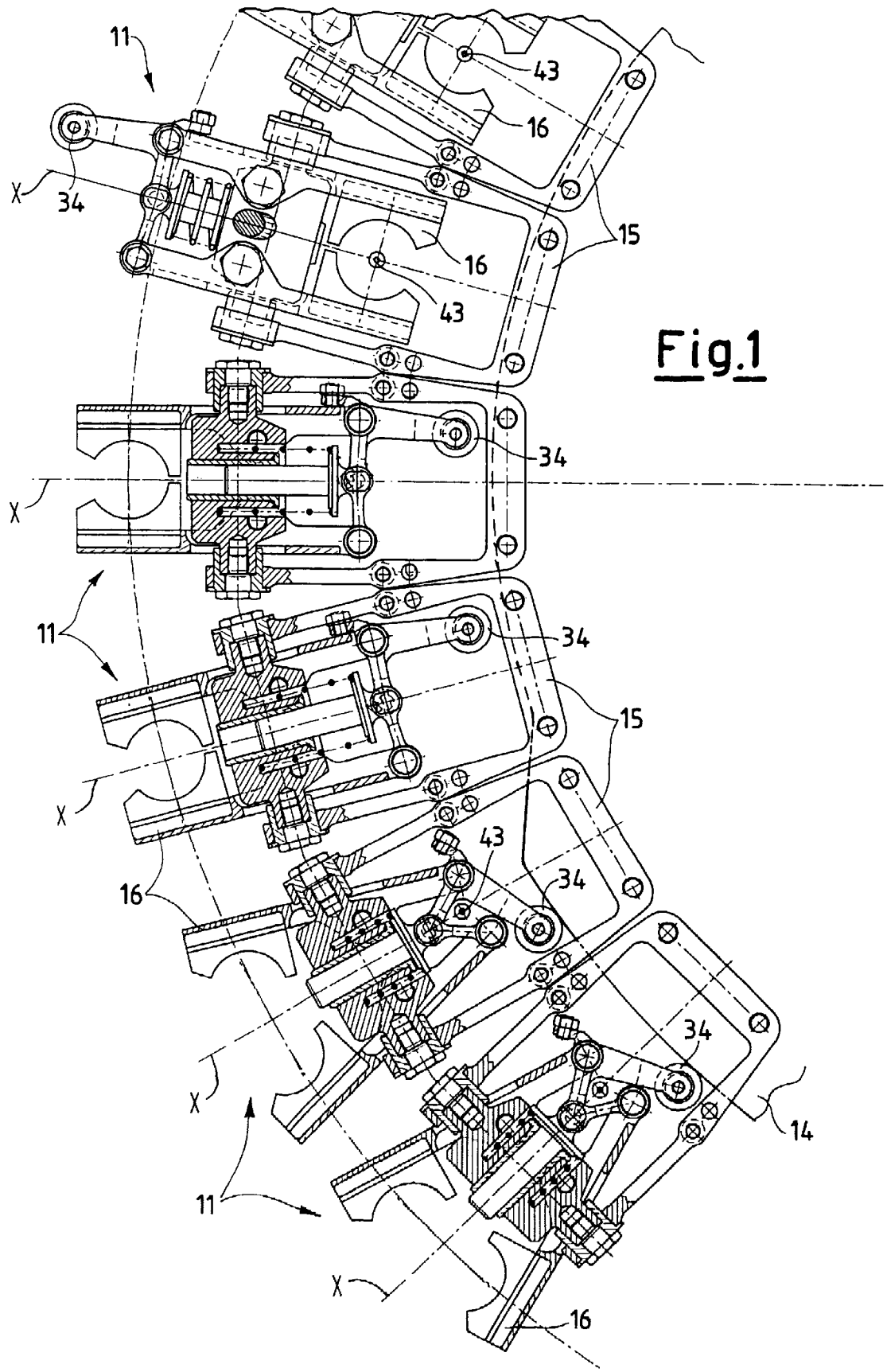
FIG. 1 is a partly sectional top plan view showing a part of the carousel carrying a plurality of grippers for containers, particularly bottles, in accordance with the invention.
Figure 2:
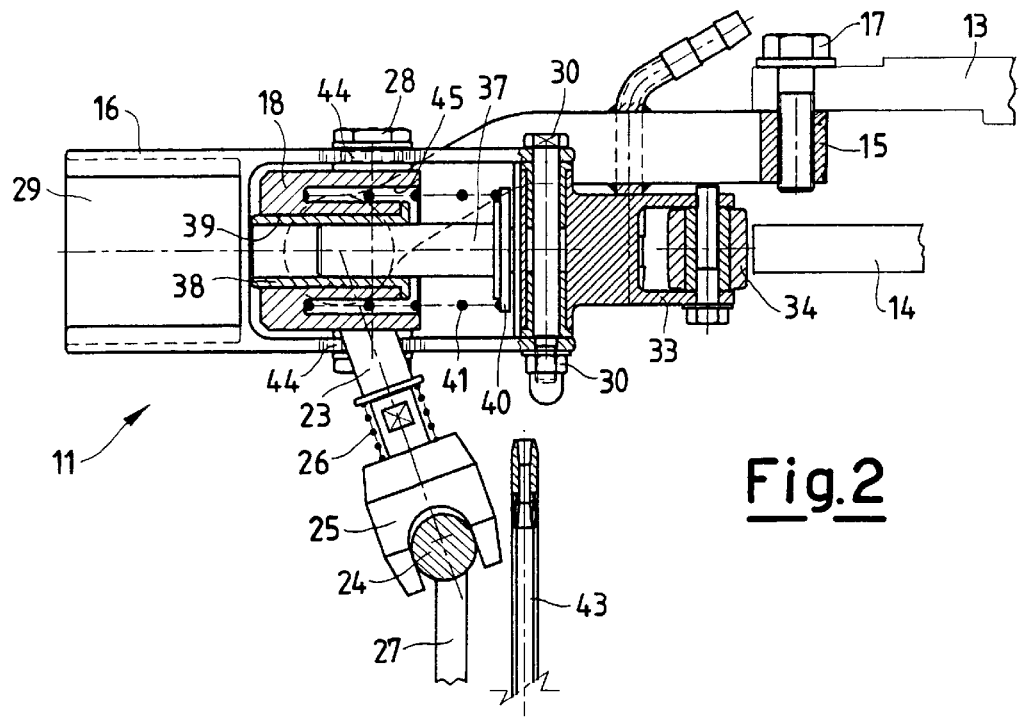
FIG. 2 is a first enlarged side elevation, with some elements shown in partial section, of a gripper closed about a container.
Figure 3:
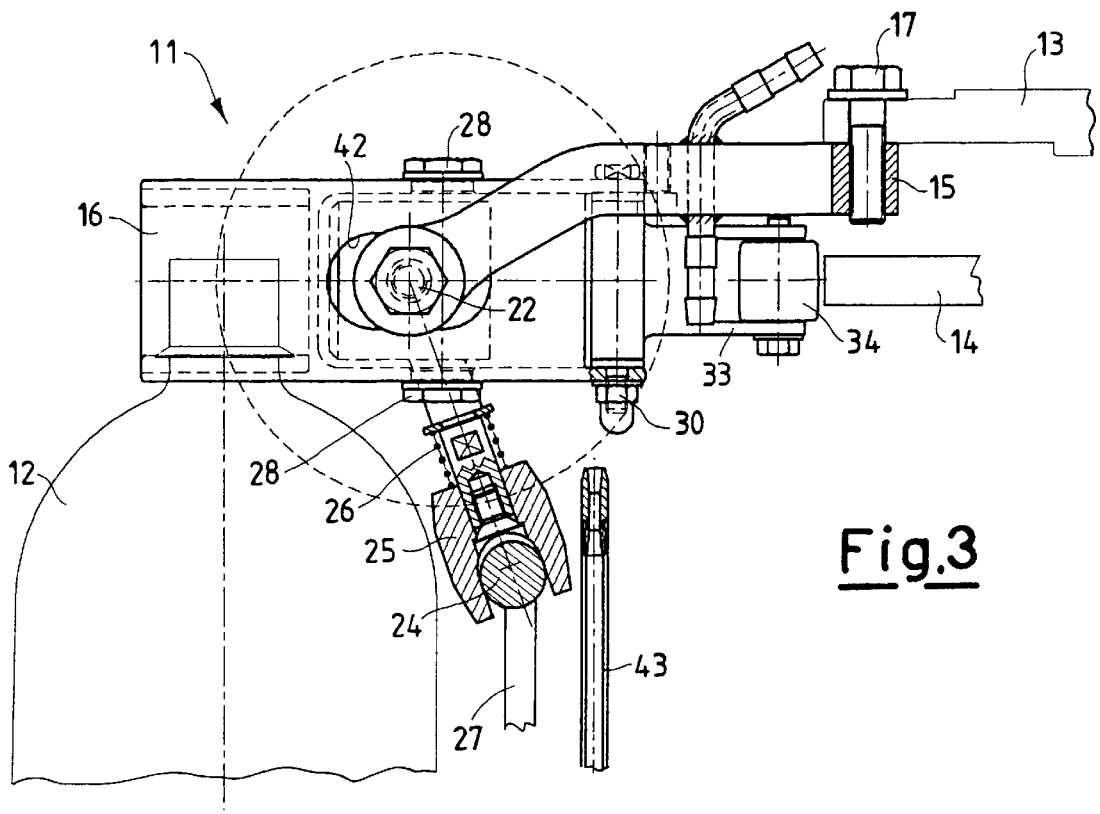
FIG. 3 is a second enlarged side elevation, with some elements shown in partial section, of the gripper of FIG. 2 closed about a container.
Figure 4:
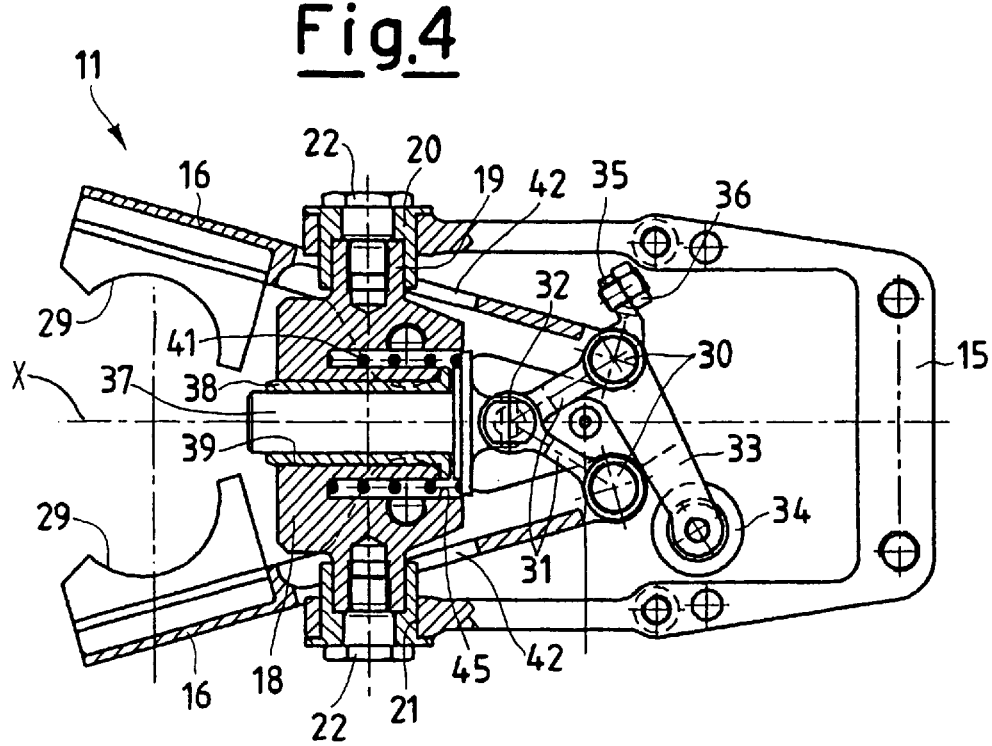
FIG. 4 is an enlarged plan view from above showing an open gripper in partial section.
Figure 5:
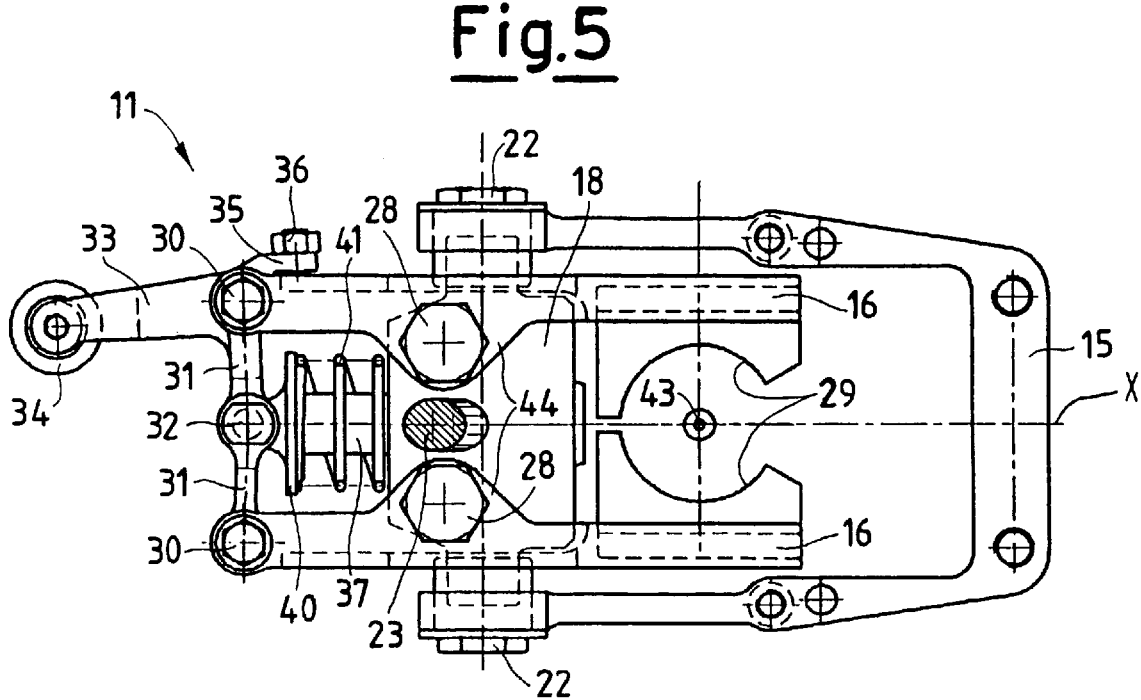
FIG. 5 is a plan view from above showing the gripper of FIG. 4 when inverted and closed.

With reference to FIG. 1, this shows a plurality of container grippers 11, formed in accordance with the invention, in particular for bottles 12 shown in FIG. 3. The grippers 11 are arranged on a carousel, only partly shown at 13, of a manipulating machine for bottles or similar containers.

The carousel 13 is rotated by a drive (not shown). In this manner the carousel 13 carries the grippers 11, or parts of them, one after another into engagement with a cam 14 which opens them to grasp the neck of the bottle 12 and/or releases them after the bottle has been grasped.

From the figures it can be seen that each gripper 11 comprises essentially a support structure internally carrying a pair of arms 16 driven to rotate between a closed rest position in which they face each other, and an open position in which they are withdrawn from each other.

The structure comprises a U-shaped bracket 15 which can be fixed in an intermediate region to the carousel 13 by bolts 17, between its open ends there being positioned a block 18. Via its cylindrical ends 19 of smaller cross-section, the block 18 can rotate about said U bracket 15. This is made possible by inserting the cylindrical ends 19 into sleeves 20 inserted into holes 21 in the free ends of the bracket 15. The parts are fixed together by a bolt 22 passing freely through a hole in the sleeve 20, such as to enable the block 18 to rotate.

This rotation is used to invert the bottle 12 when necessary, by turning it through 180° by rotating the block 18 within the support bracket 15. A suitable shaft 23, fixed to the block 18 and projecting from it, cooperates with an endless rod 24 fixed to an extension 27 of the machine structure and acting as a guide for the rotation of the block 18. The endless rod 24 surrounds the carousel and, by following a certain sinusoidal pattern, causes the movement of the shaft 23.

This latter engages the rod 24 via its terminal fork portion 25, which is maintained in permanent contact by cooperation with a spring 26.

The arms 16 are rotatable by being pivoted by pairs of pivoting bolts 28 located on opposite sides of the rotatable block 18 and only partially inserted into it in dead holes (not shown). Each arm 16 is of box form with a U cross-section and central lugs 44 for locating said bolts 28. A first end of the arms 16 carries a profiled portion 29 extending towards the facing arm and arranged to receive pads (not shown). In this manner pads of different sizes can be used, to make the gripper adaptable to bottles or containers 12 having different sized gripping regions. In an intermediate portion of the arms 16, between the central lugs 44, there are provided lateral slots 42 through which the sleeves 20 pass, together with the cylindrical ends 19 which rotatably support the block 18. The slots 42 allow the arms to open, and which would otherwise become locked as soon as they are rotated. Connecting rods 31 are pivoted at a first end to the second end of the arms 16 at 30, and are hinged together at their other end by a pivot 32. One of the connecting rods 31 extends into a right-angled lever 33 carrying an idle wheel 34 arranged to interact with the said fixed cam 14 positioned in a localized region of the manipulating machine. In the illustrated advantageous arrangement the right-angled lever 33 is in the gripper rest position aligned with the arms 16, the connecting rods 31 being perpendicular to it. The right-angled lever 33 is positioned at about 90° to the connecting rods 31.

The right-angled lever 33 also carries a travel-limiting appendix 35 which acts as a stop for its rotation by abutting against the outside of the arm 16. The position of the stop appendix 35 can also be adjusted to a certain extent by a screw 36 which varies the abutment position.

The pivot 32 is central between the sides of the U bracket 15, to it there also being fixed the end of a pin 37 which is inserted through a bush 38 inserted into a seat 39 provided in the block 18. A spring 41 interacts between a flange 40 rigid with the head of the pin 37, and an outwardly open seat 45 provided for the spring and and coaxial with the seat 39 for the bush 38. The spring 41 usually tends to urge the pin 37 at least partly away from its seat 45 or out of the seat 39 or bush 38. In this manner it closes the arms 16 of the gripper of the invention.

It should be noted that the gripper of the invention opens symmetrically, although being controlled by a right-angled lever 33 acting directly on only one connecting rod 31. This is achieved by the interaction of the wheel 34 and the fixed cam 14, which rotates the right-angled lever 33. This causes the respective connecting rod 31 to rotate towards the interior of the U bracket 15, resulting in opening of the respective arm 16. However, at the same time the central pivot 32 also rotates the second connecting rod 31 involved with this pivot, to also rotate the second arm 16. The presence of the pin 37 perfectly correlates this simultaneous movement of the arms 16, which rotate about the pairs of bolts 28 acting as rotation pins. Maximum opening of the two arms is determined by the flange 40 of the pin 37, which as this retracts into its seat 39 abuts against the bush 38.

Both the seat 45 for the spring 41, coaxial with the seat for the bush 38, and other elements of the gripper are open outwards to enable them to be cleaned. Generally there is therefore no element of the gripper of the invention which cannot be reached during cleaning.

It should be noted that the opening of the gripper is determined by an external element, namely the cam, which acts on an opening mechanism which is totally internal and incorporated into the moving part of the gripper. In this respect, it should be noted that the block 18 is rotatable about the sleeves 20 and about the cylindrical ends 19 which support it. The reason for this is to be able to also invert the bottle to enable it to be rinsed and/or sterilized by for example a suitable nozzle 43 provided in the machine.

The provision of only one right-angled lever 33 to open the entire gripper by interacting with the cam 14 results in resolution of the forces acting on the gripper into forces normal to the axis of the pin 37 and tangential forces, with lesser wear of the interacting parts.

Moreover this particular uneven arrangement of the operating right-angled lever 33 enables the gripper to be mounted either as a right-hand or left-hand gripper without any problem.

The geometry involved in arranging the various parts makes the gripper of the invention very compact and suitable for machines of small overall dimensions. In particular, this gripper compactness makes it possible to construct machines having a very small distance between one gripper and the next.

The presence of profiled portions on the gripper arms enables pads of various types to be mounted, making it possible to manipulate bottles with different diameter gripping regions.

The Italian priority application No. MI97A 00076 is herein incorporated by reference.

What is claimed is:

1. A container gripper which has a longitudinal axis and is positionable on a movable part of a manipulating machine for one of a bottle and a container, which comprises:

a support structure having a pair of arms operable symmetrically with respect to the longitudinal axis of the gripper in order to rotate between a closed, rest position, and an open position to release the bottle or container, said support structure including a U-shaped bracket;

a block rotatable about said bracket, said block having a seat mounted thereon, said arms having a gripping portion at one end and being pivotably mounted at one end thereof on a pivot pin located substantially centrally of said bracket and located at an end of said arms opposite said one end for closing the arms;

a fixed cam;

a pair of connecting rods mounted on the ends of said arms for rotating said arms;

a right-angled lever which is oriented at substantially a right angle with respect to one of said connecting rods, is engageable with said cam and which is engageable with one of said rods;

a pin slidable with said seat mounted on said block, said connecting rods being pivoted at one end thereof to said pin slidable within said seat;

an elastic element positioned in proximity with said mounting block when said arms are in the closed position; and a mechanism for rotating said arms into a substantially inverted position so as to invert the bottles or containers and empty the contents thereof.

2. A gripper as claimed in claim 1, wherein said gripper is in a rest position, said right-angled lever is aligned with said arms and said connecting rods are substantially perpendicular to said arms.

3. A gripper as claimed in claim 1, wherein said right-angled lever is positioned at substantially a 90° angle with respect to said connecting rod from which said right angled lever extends.

4. A gripper as claimed in claim 1, which comprises a travel-limiting appendix which extends from said right angled lever; said appendix determining a closed position of said arms.

5. A gripper as claimed in claim 1, which comprises a flange connected to a head of said pin, and an outwardly open seat coaxial with said seat in which said pin slides and a spring which is positioned between said flange and said open seat.

6. A gripper as claimed in claim 1, wherein said block is rotatable about said bracket via opposing cylindrical ends of said block, said opposing ends being inserted into sleeves, located in free end portions of said brackets, and comprising a bolt provided to connect said ends of said block and said sleeves respectively such that said block is rotatable.

7. A gripper as claimed in claim 1, which comprises pairs of pivoting bolts which partially inserted into said block from opposite sides thereof and which pivotably secure said arms to said block.

8. A gripper as claimed in claim 1, wherein each of said arms is box shaped having a U-shaped cross-section and central lugs for locating said pivoting bolts.

9. A gripper as claimed in claim 1, wherein said mechanism for rotating said arms comprises and endless rod and a shaft extending from said block, said shaft projecting so as to cooperate with said endless profiled rod, said rod being fixed to a fixed part of the machine to act as a guide for a substantially 180° rotational movement of said block.

10. A gripper as claimed in claim 1, which comprises a bush positioned in said seat in said block wherein said pin is slidable within said bush.

* * * * *